(No Model.)  2 Sheets—Sheet 1.

S. B. HART.
BROADCAST SEEDING MACHINE.

No. 323,328. Patented July 28, 1885.

Witnesses,
Robert Everett.
Chas. F. Hyer.

Inventor:
Stacy B. Hart.
By James L. Norris.
Atty.

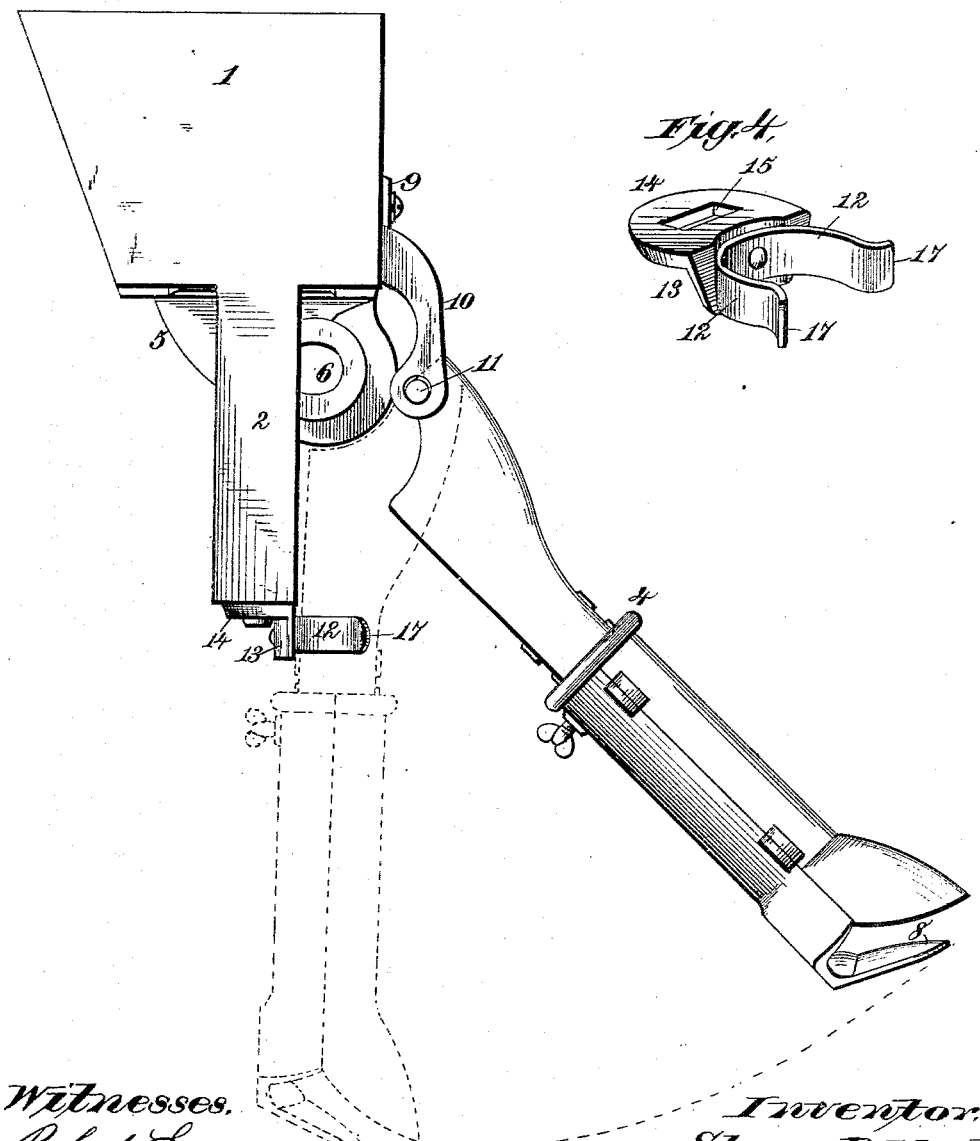

UNITED STATES PATENT OFFICE.

STACY B. HART, OF PEORIA, ILLINOIS.

BROADCAST-SEEDING MACHINE.

SPECIFICATION forming part of Letters Patent No. 323,328, dated July 28, 1885.

Application filed November 17, 1884. (No model.)

*To all whom it may concern:*

Be it known that I, STACY B. HART, a citizen of the United States, residing at Peoria, in the county of Peoria and State of Illinois, have invented new and useful Improvements in Broadcast-Seeding Machines, of which the following is a specification.

This invention relates to improvements in that class of seeding-machines in which seed-conveying spouts are connected with a hopper and hang at a distance from the ground, the lower ends of the spouts having devices for scattering the seed broadcast.

The object of my invention is to provide novel, simple, and efficient means for supporting the spouts and permitting them to yield rearwardly should they in their travel meet an obstruction over which they could not pass without danger of breakage or injury if inflexibly fixed in position.

The object of my invention is accomplished in the manner and by the means hereinafter described and claimed, reference being had to the accompanying drawings, in which—

Figure 1:
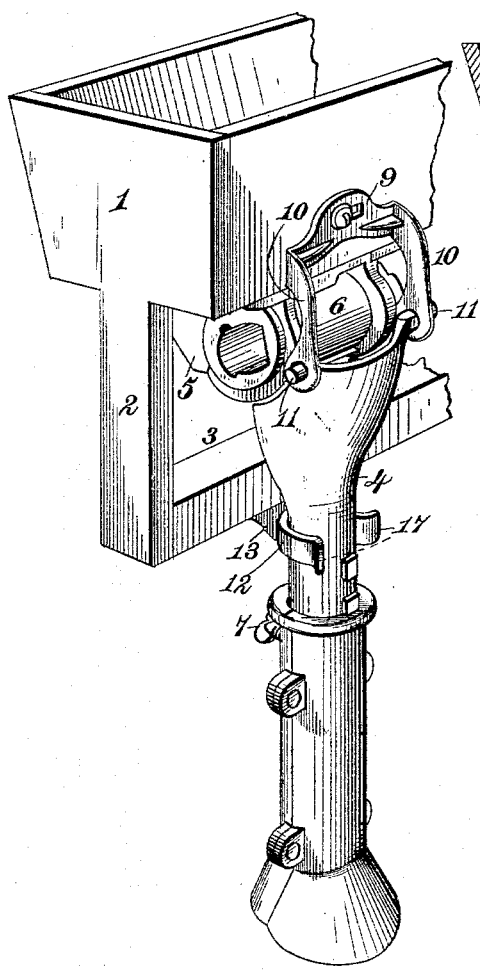
Figure 2:
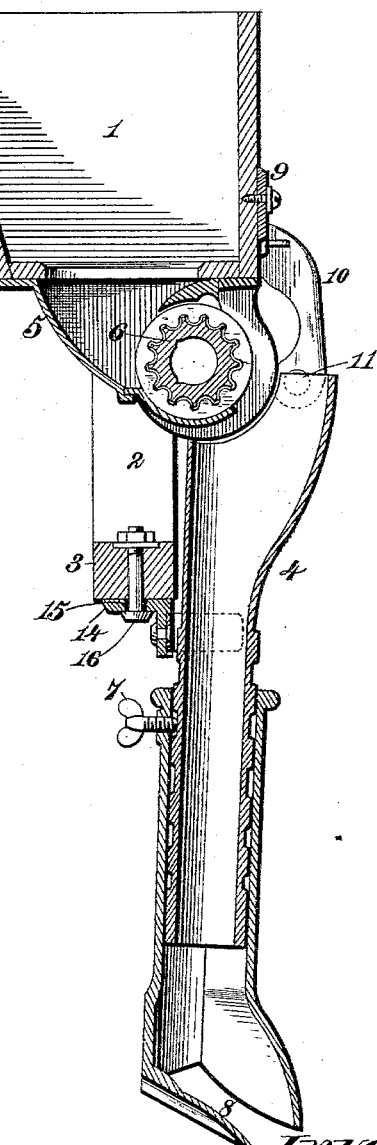

Figure 1 represents a perspective view of the hopper of a seeding-machine, showing my invention applied thereto; Fig. 2, a vertical sectional view taken centrally through one of the seed-spouts; Fig. 3, an end elevation, showing the spout swung rearward from its detaining and releasing device, as when it strikes an obstruction, and Fig. 4 a detached perspective view of the detaining and releasing device.

The number 1 indicates a grain-hopper of the usual or suitable construction, having at each end a pendent bracket, 2, to the lower extremities of which are secured the ends of a cross-bar, 3, which, as shown, is parallel to the bottom of the hopper; and 4 indicates the grain-conveying spout. The hopper will be suitably supported by an axle having carrying ground-wheels; but such being common are not illustrated. There are a series of the grain-spouts employed in practice; but as all are alike, as well as the means used to deliver the grain from the hopper to the spout, a description of one will be sufficient to enable the invention to be clearly understood. The hopper-bottom is provided with an attached seed-cup, 5, containing a feed-wheel, 6, which is of the usual adjustable construction to enable the quantity of seed delivered from the cup to the spout to be varied as circumstances require.

The spout 4 is made in two tubular sections, the lower section being adjustable on the upper one, and held in its adjusted position by a set-screw, 7, the object being to vary or change the distance of the scattering device 8 from the surface of the ground. The scattering device is simply a curved plate on which the grain falls, so that such grain is scattered broadcast.

To the rear wall of the hopper is attached a bracket, 9, having pendent arms 10, provided with openings in their lower ends, in which are journaled lateral lugs 11 at the top of the upper section of the spout, so that the entire spout can freely swing rearward, and to the under side of the cross-bar 3 is secured the spout detaining and releasing device, which is composed of two semicircular spring-jaws, 12, riveted or otherwise secured to a depending lug, 13, on a flat plate, 14, having a slot, 15, through which and the cross-bar passes a bolt, 16, for attaching the plate in position. The spring-jaws are of such size as to clamp and partially encircle or embrace the lower tubular body of the upper section of the spout; but if the latter meets an obstruction, over which it could not readily pass, it will easily glide from between the jaws and swing rearward on its pivotal connection with the hopper, as seen in Fig. 3. When the obstruction is passed, the spout swings forward by gravity or by its own weight, and the forward swinging movement is sufficient to cause the tubular body of the spout to enter the jaws, spreading the latter by their laterally-curved ends 17, and when between the jaws the latter close by their inherent elasticity and closely embrace the spout. This construction is important, in that when the jaws embrace or encircle the tubular body of the spout they retain the latter in an operative position and against rearward swinging movement if the spout should meet an obstruction which it could break or remove from its path without danger of breakage or injury, while if any substantial obstruction is met the spout will yield and leave the jaws.

It must be understood that the broadcast grain-scattering spout hangs, so that its lower end does not travel in or upon the ground, and hence the combination provides efficient means whereby, when the spout meets an obstruction and swings rearward, it will swing forward by gravity or its own weight, and thereby automatically engage itself with the spring detaining and releasing device while the machine is traveling over the field; but if, for any reason, this operation should not occur the attendant, riding in rear of the machine, can use his foot or other means to push the spout into engagement with the detaining device.

The combination and arrangement of parts constituting my invention provide very simple, strong, and efficient means for permitting the scattering-spout to yield rearward to pass an obstruction which it may meet in its travel over the field; but I would have it understood that I do not broadly claim any device for accomplishing this purpose, as such has heretofore been done by a wooden break-pin in a manner too well known to require specific explanation, and is obviously objectionable.

I am also aware that in grain-drills a drill-boot entering the ground has been pivoted to a drag-bar which carries two spring-jaws to seize a flange on the drill-boot, such boot swinging rearward from the jaws if an obstruction is met as its point travels in the ground; but such is a different thing from a broadcast grain-scattering spout hanging above the ground and held by spring-jaws which encircle its tubular body, and which jaws are carried by a stationary part of the machine, whereby the spout may automatically engage itself with the jaws by gravity or its own weight.

Having thus described my invention, what I claim is—

1. The combination, with a pivoted spout hanging at a distance from the ground and having means to scatter grain broadcast, of a spring detaining and releasing device secured to a stationary part of the frame, said spout being capable of disengaging itself from the device and yield rearward when an obstruction is met and to swing forward and engage itself with the device when the obstruction is passed, substantially as described.

2. The combination of a hopper, a cross-bar supported below the same, a swinging grain-spout and a spout detaining and releasing device carried by the cross-bar, the spout being capable of disconnecting itself from the device and yielding rearward when an obstruction is met and of swinging forward and connecting with the device when the obstruction is passed, substantially as described.

3. The combination of a hopper, a cross-bar supported below the hopper, a swinging grain-spout, and two spout detaining and releasing spring-arms carried by the cross-bar, the spout being capable of disconnecting itself from between the spring-arms and yielding rearward when an obstruction is met and of swinging forward between the said arms when the obstruction is passed, substantially as described.

4. The combination of a tubular swinging spout for scattering grain broadcast, of a spout detaining and releasing device composed of two spring-jaws constructed to encircle the tubular body of the spout, substantially as described.

5. The combination of a hopper, a broadcast grain-scattering spout having its upper end pivoted upon the hopper, and a spout detaining and releasing device composed of two spring jaws for detaining the spout but permitting it to yield rearward when an obstruction is met, substantially as described.

In testimony whereof I have hereunto set my hand in the presence of two subscribing witnesses.

STACY B. HART.

Witnesses:
FRANK HITCHCOCK,
DAVID S. LEE.